(12) United States Patent
Graham

(10) Patent No.: US 8,363,820 B1
(45) Date of Patent: Jan. 29, 2013

(54) HEADSET WITH WHISPER MODE FEATURE

(75) Inventor: John S Graham, Scotts Valley, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1627 days.

(21) Appl. No.: 11/804,094

(22) Filed: May 17, 2007

(51) Int. Cl.
*H04M 1/00* (2006.01)

(52) U.S. Cl. ......... 379/390.03; 379/390.02; 379/390.04; 704/233; 704/235; 704/225

(58) Field of Classification Search ...... 379/387.01–397
See application file for complete search history.

(56) References Cited

U.S. PATENT DOCUMENTS

| | | | |
|---|---|---|---|
| 5,329,243 A * | 7/1994 | Tay | 330/136 |
| 2002/0090078 A1* | 7/2002 | Feltstrom et al. | 379/390.01 |
| 2006/0085183 A1* | 4/2006 | Jain | 704/233 |
| 2008/0162127 A1* | 7/2008 | Laaksonen et al. | 704/225 |

* cited by examiner

*Primary Examiner* — Yuwen Pan
*Assistant Examiner* — Ibraham Sharifzada
(74) *Attorney, Agent, or Firm* — Chuang Intellectual Property Law

(57) ABSTRACT

Systems and methods for operating a telecommunications device in whisper mode are presented. The method generally includes adjusting a transmit audio signal gain responsive to a transmit audio signal voice activity status, transmit audio signal speech level, transmit audio signal signal-to-noise ratio, and receive audio signal voice activity status. A sidetone feedback signal gain is adjusted in conjunction with adjusting the transmit audio signal gain.

29 Claims, 7 Drawing Sheets

HEADSET WITH WHISPER MODE FEATURE

BACKGROUND

Headsets, and telephones in general, are designed with a microphone to accept audio inputs from the headset user and a speaker to provide an audio output to the headset user. In the prior art, the gain levels of the microphone and speaker are generally fixed. These fixed levels have been determined to adequately communicate a normal conversational level vocal input.

However, when a headset user is in a meeting or another quiet place, it is frequently inconvenient to speak loudly enough so that the user can be heard by the user at a far-end receiver without disrupting the others at the venue. In the past, headset users typically attempt to shield their mouths or leave the venue to find a private place to talk.

Audio communications may be impaired if the user begins to speak in a low volume and low audio levels are input to the headset microphone. The abnormally low input may result in unintelligible audio signals output from the speaker of the receiver at the far end user.

Thus, improved methods and systems for telecommunications during low levels of user speech are needed.

DESCRIPTION OF THE DRAWINGS

The features and advantages of the apparatus and method of the present invention will be apparent from the following description in which.

DESCRIPTION OF SPECIFIC EMBODIMENTS

Figure 1:
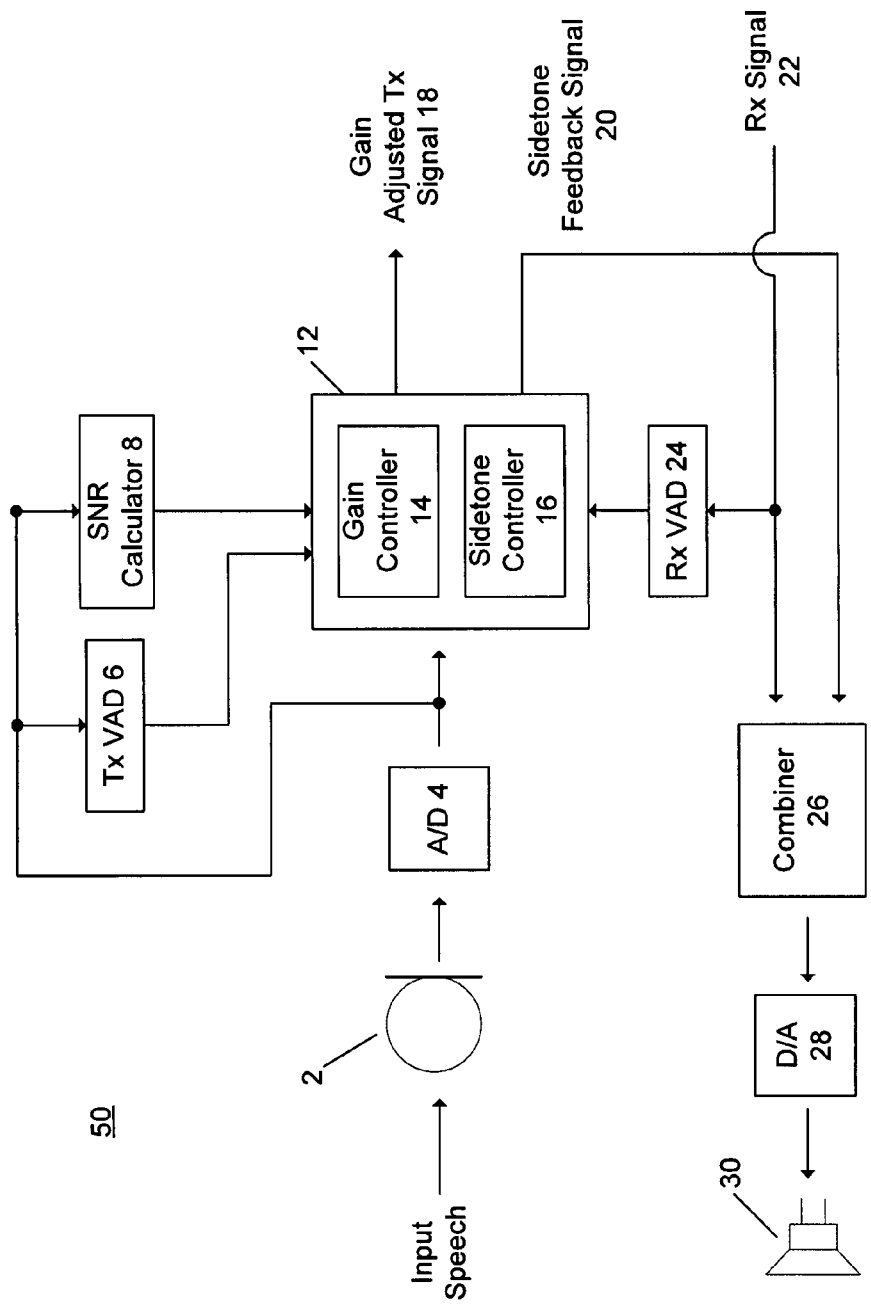
FIG. 1 illustrates an example of a simplified block diagram of a headset with a whisper mode controller.

The present invention provides a solution to the needs described above through an inventive method and apparatus for processing audio signals during low levels of user speech.

Other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive. The data structures and code described in this detailed description are typically stored on a computer readable storage medium, which may be any device or medium that can store code and/or data for use by a computer system. Furthermore, although software code or components are described in certain instances, those skilled in the art will recognize that such may be equivalently replaced by firmware and hardware components. For purpose of clarity, details relating to technical material that is known in the technical fields related to the invention have not been described in detail so as not to unnecessarily obscure the present invention.

In one example of the invention, a headset user can be heard by a far end user while speaking softly at a low speech level (or "whispering"), using either voiced or unvoiced speech. A system and method analyzes speech and ambient noise levels and causes the headset to go into a "whisper mode" when appropriate. When whisper mode is entered, both the transmit signal gain and the sidetone feedback signal gain are increased on the transmit side. By adjusting the sidetone feedback signal gain, the user is encouraged to speak louder or softer. For example, if the sidetone feedback signal gain is increased, it encourages the user to speak less loudly. In one example, the headset automatically determines whether whisper mode conditions are present. For example, whisper mode can occur when speech levels are low and ambient noise is low.

The present invention is applicable to both digital and analog headsets or telecommunications devices in a wired or wireless telecommunications system. The examples herein, however, are directed at whisper mode processing in a digital headset or telephone. In one example, the whisper mode feature can be implemented by a push button switch or other mechanism. Using a switch prevents the headset from falsely detecting a whisper mode condition, and the transmit signal gain and sidetone feedback signal gain settings can thus be made more aggressive and effective. Otherwise, the whisper mode feature can be implemented using a combination of speech detection algorithms and noise detection algorithms. Some of the implementation details such as the actual speech and noise signal levels are device and application dependent. The described algorithms may include supporting algorithms such as noise reduction signal processing techniques.

In one example of the invention, a method for operating a telephonic device in a whisper mode includes receiving a transmit audio signal, determining a transmit audio signal voice activity status, calculating a transmit audio signal speech level, and calculating a transmit audio signal signal-to-noise ratio. The method further includes determining a receive audio signal voice activity status. The transmit audio signal gain is adjusted responsive to the transmit audio signal voice activity status, the transmit audio signal speech level, the transmit audio signal signal-to-noise ratio, and the receive audio signal voice activity status. A sidetone feedback signal gain is adjusted in conjunction with adjusting the transmit audio signal gain. The sidetone feedback signal gain is adjusted responsive to the transmit audio signal voice activity status, the transmit audio signal speech level, the transmit audio signal signal-to-noise ratio, and the receive audio signal voice activity status.

In one example of the invention, an apparatus such as a circuit includes a transmit audio signal voice detector for determining a transmit audio signal voice activity status, a transmit audio signal speech level calculator for calculating a transmit audio signal speech level, and a transmit audio signal strength signal-to-noise ratio calculator for calculating a transmit audio signal signal-to-noise ratio. A receive audio signal voice detector determines a receive audio signal voice activity status. The circuit includes a whisper mode operation controller including a transmit audio signal gain controller for adjusting a transmit audio signal gain and a sidetone feedback signal gain controller for adjusting a sidetone feedback signal gain in conjunction with adjusting the transmit audio signal gain. The transmit audio signal gain controller and sidetone feedback signal controller operate responsive to the transmit audio signal voice activity status, the transmit audio signal speech level, the transmit audio input signal-to-noise ratio, and the receive audio signal voice activity status.

FIG. 1 illustrates an example of a simplified block diagram of a whisper mode processor in a telecommunications headset 50. A microphone 2 is coupled to an analog to digital converter 4. The analog to digital converter 4 is coupled to a transmit signal voice activity detector (Tx signal VAD) 6 which outputs a transmit voice activity status and a transmit signal speech level, a signal-to-noise ratio (SNR) calculator 8, and a whisper mode controller 12. In one example, the SNR is the relative difference between speech levels measured using ITU-T P.56 algorithm and stationary noise levels, where stationary noise is defined to be noise that typically has a peak to average ratio of less than 6 dB. One of ordinary skill in the art will recognize that there are other methods by which the SNR, speech levels, and stationary noise levels may be measured. For example, speech levels may be measured by detecting speech voltage levels in a predetermined way during valid speech, where valid speech occurs when the peak to average ratio is at a predetermined level or range. In a further example, speech levels are measured based upon detection of noise, where speech is determined to be occurring when noise is not detected. The transmit voice activity status indicates whether the transmit signal contains user speech. The whisper mode controller 12 includes a gain controller 14 and a sidetone controller 16.

The transmit signal voice activity detector 6 and SNR calculator 8 output are coupled to the whisper mode controller 12. A receive signal voice activity detector (Rx signal VAD) 24 output is also coupled to whisper mode controller 12. A receive signal 22 is input to the receive signal voice activity detector 24. Any sidetone signal present in receive signal 22 is removed prior to receive signal 22 being input to receive signal voice activity detector 24 and combiner 26.

Whisper mode controller 12 outputs a gain adjusted transmit signal 18 and a gain adjusted sidetone feedback signal 20. The gain adjusted sidetone feedback signal 20 and the receive signal 22 are input to a combiner 26 which combines the two signals for output to the headset 50 from a speaker 30 via a digital to analog converter 28. The gain adjusted transmit signal 18 is transmitted to a far end user. In one example, Tx VAD 6, SNR calculator 8, and whisper mode controller 12 are implemented with one or more digital signal processors interfacing with memory storing code and data for use thereby. For example, the memory may include non-volatile memory and/or volatile memory.

In operation, as a user speaks into the microphone 2, the microphone 2 converts the sounds into an electrical signal. This signal is passed to the A/D converter 4, which samples and digitizes the analog signal. One or more bandpass filters may be used to filter the analog signal prior to the A/D converter 4. The signal is then passed to the Tx signal VAD 6, the SNR calculator 8, and the whisper mode controller 12.

The Tx signal VAD 6 analyzes the digitized transmit signal to determine whether or not speech is present the signal. The analysis result is provided to whisper mode controller 12 for use as described below. The Tx signal VAD 6 also calculates the speech level in the signal. The SNR calculator 8 analyzes the received digital signal and calculates the signal-to-noise ratio. The speech level and SNR are also provided to whisper mode controller 12. A receive signal voice activity detector 24 analyzes a receive signal to determine whether or not speech is present in the receive signal. The analysis result is also provided to whisper mode controller 12. Based on a predetermined criteria or algorithm applied to the received data, the whisper mode controller 12 determines the gain which should be applied to the digitized transmit signal for output to a far end user and the gain of a sidetone feedback signal to be combined with a receive signal for output at speaker 30. The gain adjusted transmit signal output from the whisper mode controller 12 may be then passed to a speech encoder (not shown) which compresses the signal and passed to a modulator which modulates the signal onto a carrier for transmission by a transmitter.

Generally, whisper mode controller 12 determines whether the headset user is whispering or speaking in a low voice based upon the transmit voice activity status, the transmit speech level calculation, and the SNR calculation. Based upon these received inputs, whisper mode controller 12 utilizes gain controller 14 to adjust the gain of the transmit signal. In conjunction with the transmit signal gain adjustment, whisper mode controller 12 utilizes sidetone controller 16 to adjust the gain of sidetone feedback signal 20. In one example, when the user speech level is below a pre-determined level, the whisper mode controller 12 increases both the transmit signal gain and the sidetone feedback signal gain. The adjustment level of both the transmit signal gain and the sidetone feedback signal gain may vary proportionally to the change in user speech level. In this manner, the gain of the sidetone feedback signal 20 is advantageously adjusted so as to control the speech level of the headset user while in whisper mode. If the headset user does not hear their own voice at an elevated level, they may tend to speak louder, thinking that they may not be heard at the far end, thus not accomplishing the goal of being discreet. By providing a louder sidetone signal, the headset user will lower their voice, since they will have the "sense" that they are speaking loud enough to be "heard" at the far end of the call.

Figure 2A:
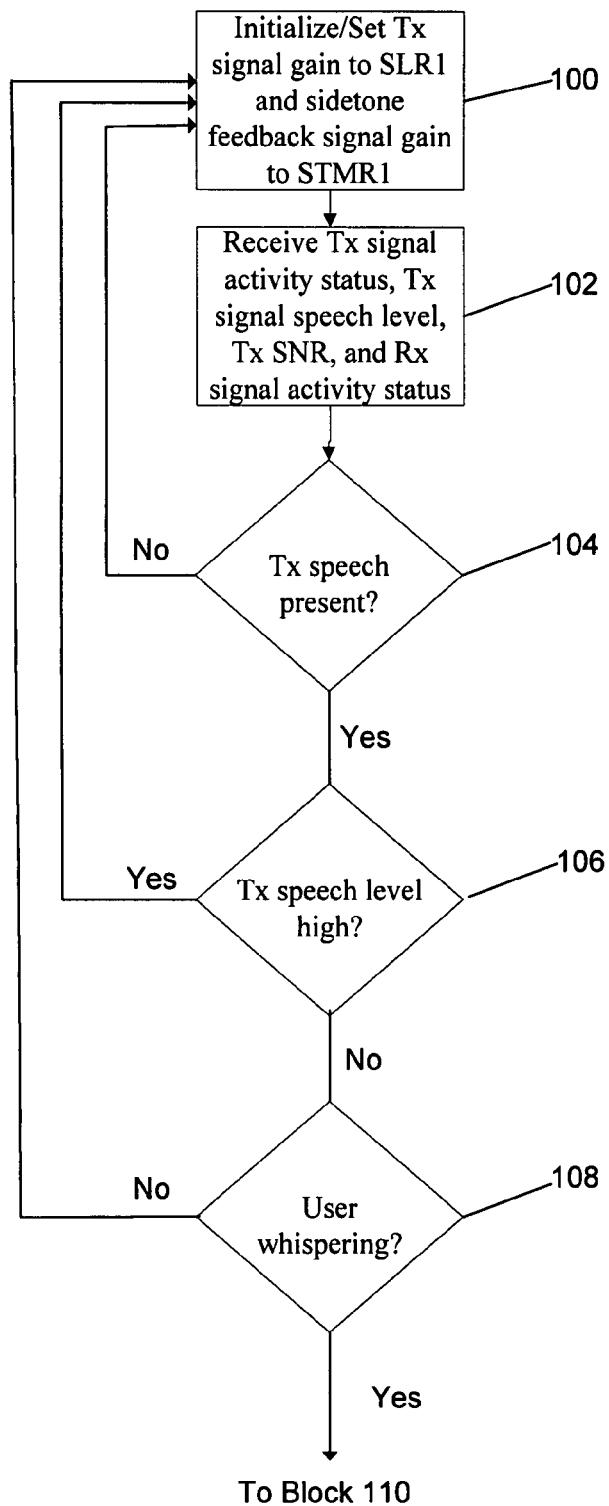
FIGS. 2A-2C are a flowchart illustrating the operation of the invention in one example.
Figure 2B:
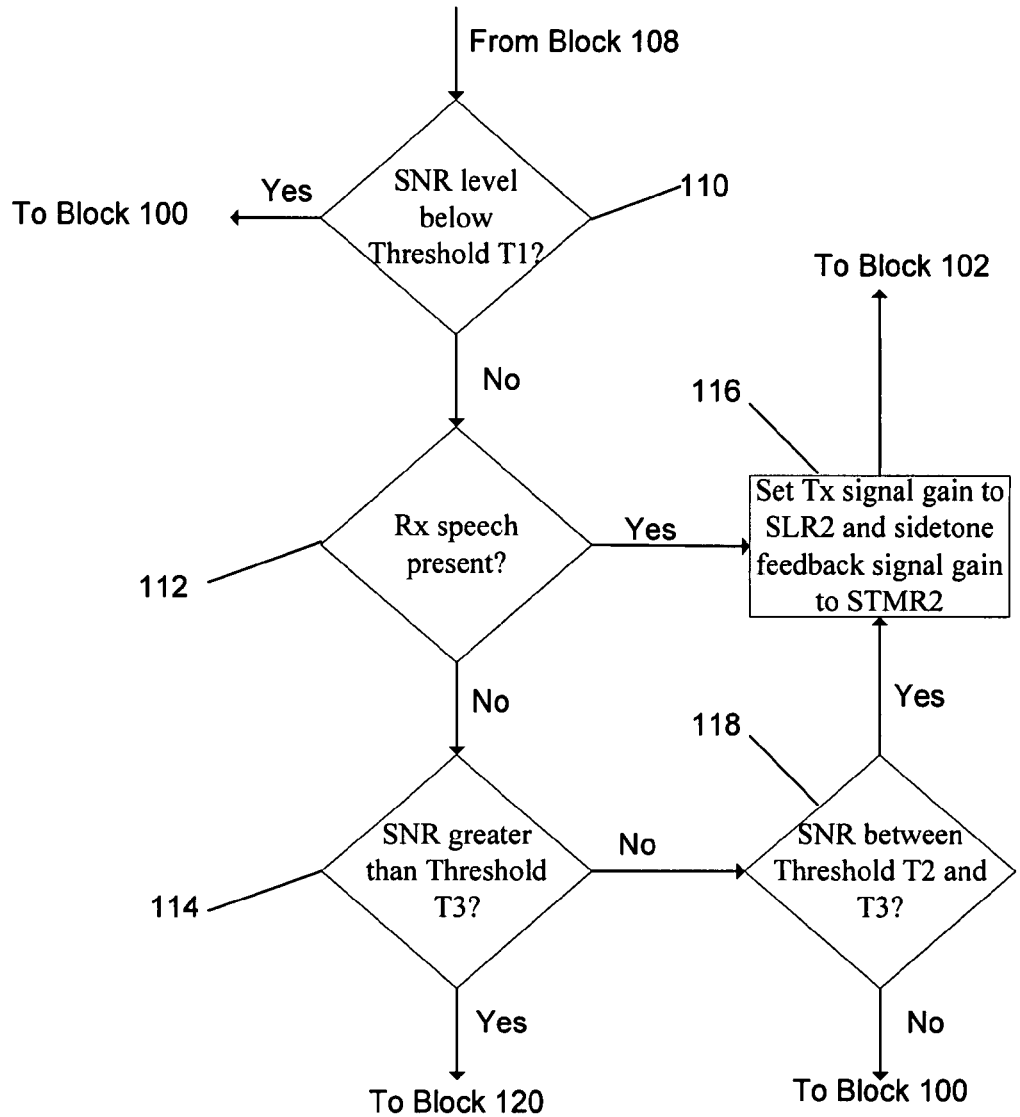
Figure 2C:
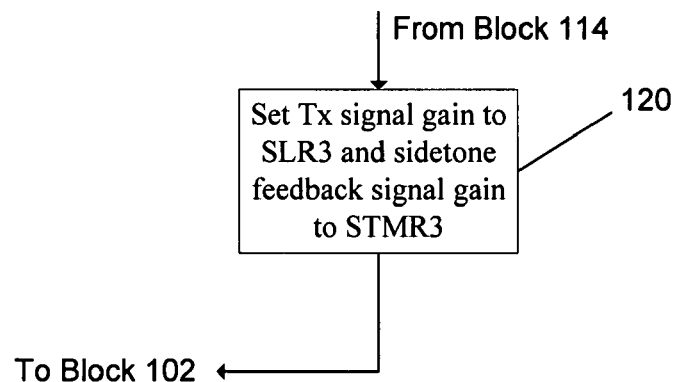

FIGS. 2A-2C illustrate a process for adjusting a transmit signal gain and a sidetone feedback signal gain responsive to varying input signals. At block 100, a whisper mode controller initializes/sets the transmit signal gain to a predetermined value. This predetermined gain value may be set to correspond to a particular send loudness rating (SLR) SLR1 typical for normal speech levels in a given application. The SLR is a "loss" in dB that describes perceived loudness of transmitted speech, referenced to the middle of the telecom network (or 0 TLP) as per ITU-T P.79, which is a telecom standard. 0 TLP is the zero transmission level point, referring to speech signals in the middle of the telecom network, including both traditional and VoIP networks. This predetermined value is a typical value known in the art, and is dependent upon the type of telecommunication device, intended use, and other factors. For example, in a headset application, the transmit signal gain value may vary based on whether the headset is boomless, has a short boom, or has a long boom. The transmit signal gain setting also varies based on whether the headset will be used in an indoor or outdoor environment.

At block 100, the whisper mode controller also initializes/sets a gain of a sidetone feedback signal to a predetermined value typical for normal speech levels. Like the transmit signal gain, this predetermined value is a typical value known in the art, and is dependent upon the type of telecommunication device and intended use. The gain of the sidetone feedback signal may be set to correspond to a particular sidetone masking rating (STMR) STMR1. The STMR is a "loss" in dB that describes the perceived loudness of the transmitted speech that is re-directed to the user's ear by way of the receiver as per ITU-T P.79.

At block 102, the whisper mode controller receives a transmit signal voice activity status, transmit signal speech level, transmit signal SNR, and receive signal voice activity status. At decision block 104, if the transmit signal voice activity status corresponds to no speech present in the transmit signal, the process returns to block 100. If yes at block 104, at decision block 106 the whisper mode controller determines whether the transmit signal speech level is above a maximum level. This provides protection so that distorted speech resulting from overload is not transmitted to the telecom network. The whisper mode settings are not applied if yes at decision block 106 and the Tx signal gain and sidetone feedback signal gain are set at their normal operation levels SLR1 and STMR1. If yes at block 106, the process returns to block 100. If no at block 106, at decision block 108 the whisper mode controller determines a whisper mode status (whether the transmit signal corresponds to a user whispering or speaking at a low level of speech). If no at block 108, the process returns to block 100.

If yes at block 108, at decision block 110, the whisper mode controller determines whether the SNR level is below a first threshold level T1. If yes at block 110, the process returns to block 100. In this manner, whisper mode settings are not implemented if the SNR is poor, which may correspond to a high background noise environment. This prevents an elevated gain high noise signal from being transmitted to a far end user where speech intelligibility is insufficient for proper communications and so that the headset user's ear does not receive an elevated gain sidetone signal with high noise. If no at block 110, at decision block 112 the whisper mode controller determines if the Rx signal speech activity status corresponds to speech in the receive signal. If yes at block 112, the whisper mode controller increases the transmit signal gain to correspond to an SLR=SLR2, where SLR2<SLR1. At block 116, whisper mode controller also increases the sidetone feedback signal gain to correspond to an STMR=STMR2, where STMR2<STMR1. The settings made at block 116 correspond to one mode of whisper mode operation. The sidetone feedback signal gain increase provides user feedback so that the user understands that they are in whisper mode and can hear when they have exceeded speech levels that necessitate the extra gain. Correspondingly, the sidetone feedback signal gain is decreased to let user know when they have left whisper mode.

After block 116, the process returns to block 102. If no at block 112, at decision block 114, whisper mode controller 112 determines whether the SNR is greater than a threshold T3, where T3 is greater than T1.

If yes at block 114, then at block 120 whisper mode controller 112 increases the transmit signal gain to correspond to an SLR=SLR3, where SLR3<SLR2. At block 120, the whisper mode controller also increases the sidetone feedback signal gain to correspond to an STMR=STMR3, where STMR3<STMR2. The settings made at block 120 correspond to one mode of whisper mode operation. In this manner, the whisper mode controller introduces the maximum whisper mode gain only when there is no receive speech detected. In other words, the highest gain is applied when the user is speaking, not listening. If maximum gain applied were applied when receive speech is present, the receive speech would be amplified and undesirably sent back to far end speaker as echo. After block 120, the process returns to block 102.

If no at block 114, then at decision block 118 the whisper mode controller determines whether the SNR is between a threshold value T2 and T3, where T1<T2<T3. If yes at block 118, then the process proceeds to block 116. If no at block 118, then the process returns to block 100. Thus, the SNR level is advantageously utilized in setting the Tx signal gain and sidetone feedback signal gain values in whisper mode. Different whisper mode settings are based primarily on the SNR. Based on the SNR, the whisper mode has either a lower or higher gain setting (higher or lower SLR setting). The process predicts how softly the user will be speaking based on the SNR. For example, in a quiet lecture hall with high SNR, a user will speak less loudly, and thus the process provides more gain (lower SLR setting of SLR3) to the user Tx signal. If a user is in noisy environment having a lower SNR rating, the user will speak more loudly and the whisper mode controller will apply less gain (higher SLR setting of SLR2).

Although the process describes three discrete states/settings, the adjustment of SLR and STMR can be continuous as the SNR and receive speech vary. For example, the SLR and STMR adjustment may be increased or decreased linearly responsive to the SNR levels. There are timing elements associated with the gain changes. In one example, movements of 3 dB ramp over a time period of 200 ms, while changes of 6 dB ramp over a time period of 800 ms. There is also hysteresis in any changes. For example, changing from one mode to the next will happen as specified above, but returning to that mode will require a hysteresis spread of about 3 dB on the level conditions, as well as an additional 500 ms on the timing conditions to "bounce" between modes.

Timing elements are primarily directed at SLR changes, but also apply to STMR changes. If the changes are too slow, the whisper mode won't work as too many words will pass that won't be heard before the whisper mode setting kicks in. If the changes are too fast, pumping artifacts are introduced in the speech, as the gain/SLR is being rapidly adjusted back and forth based on a few syllables. For the pushbutton activated mode, the process illustrated in FIGS. 2A-2C is similar, but is only active while the whisper mode feature was user enabled. Specific settings for the SLR, STMR, and threshold SNR settings may be revised slightly to be more aggressive.

Figure 3A:
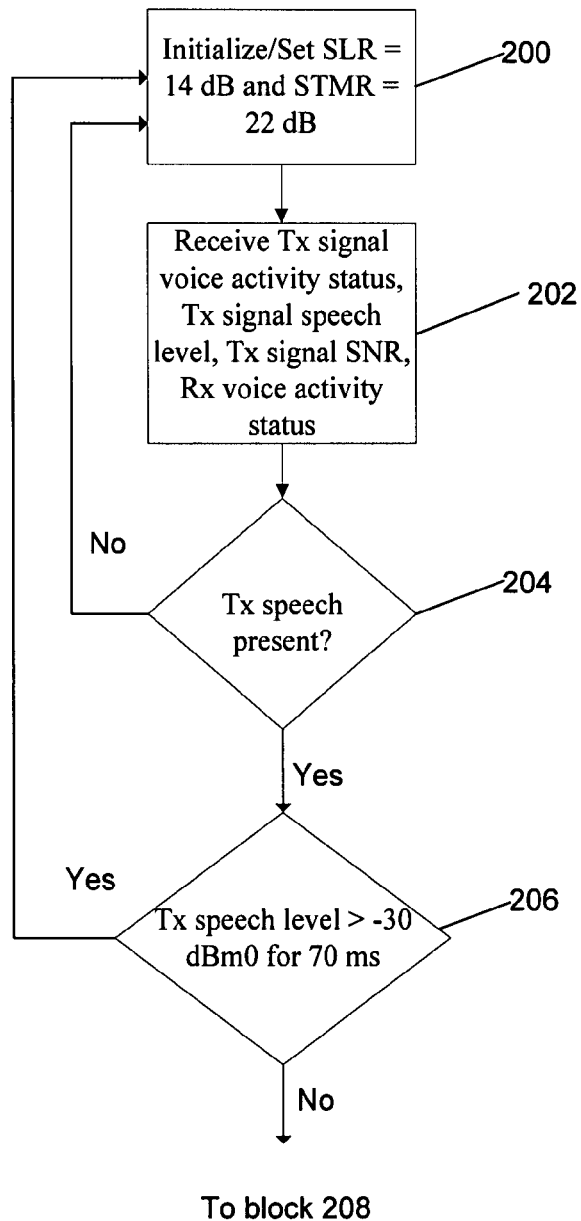
FIGS. 3A-3C are a flowchart illustrating the operation of the invention in one particular implementation of the process shown in FIGS. 2A-2C.
Figure 3B:
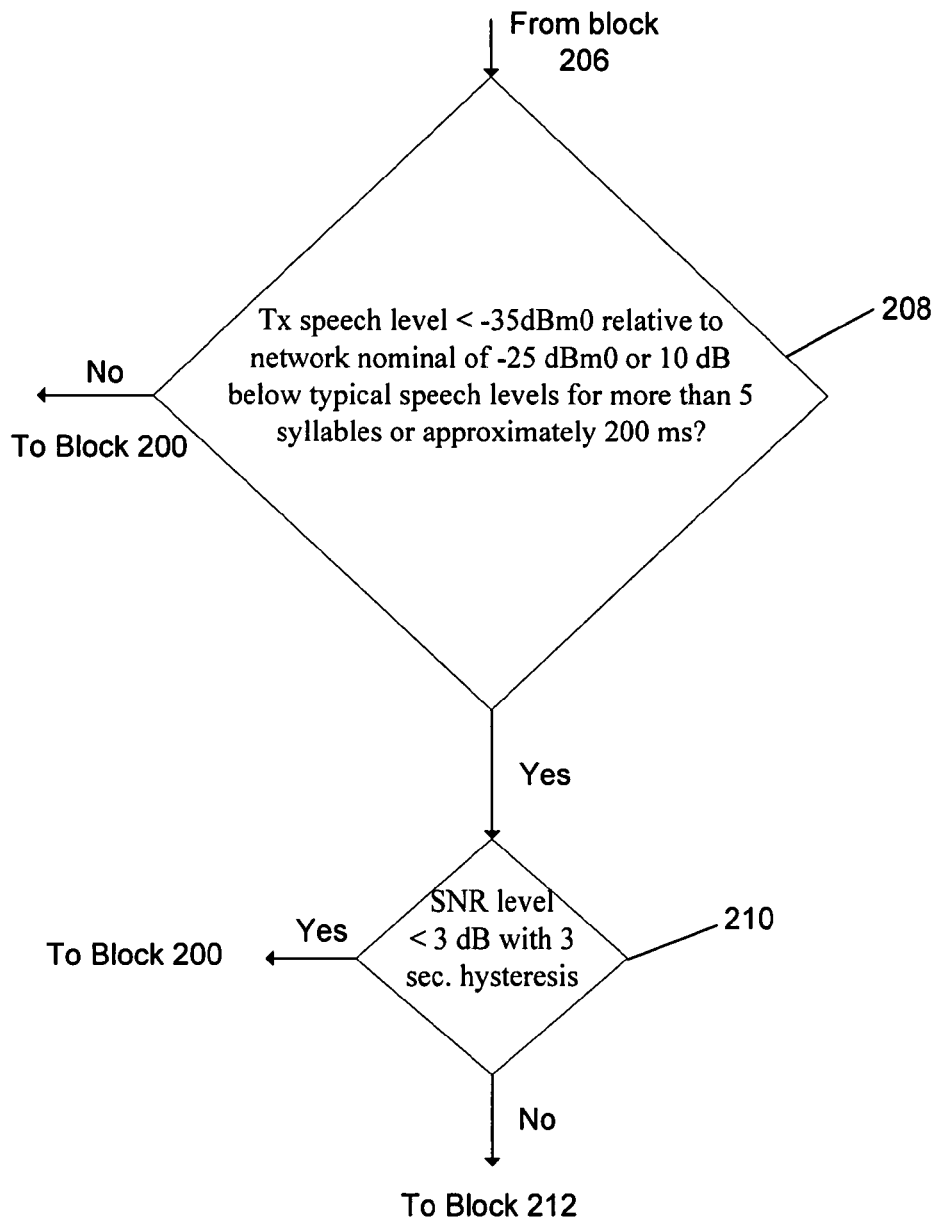
Figure 3C:
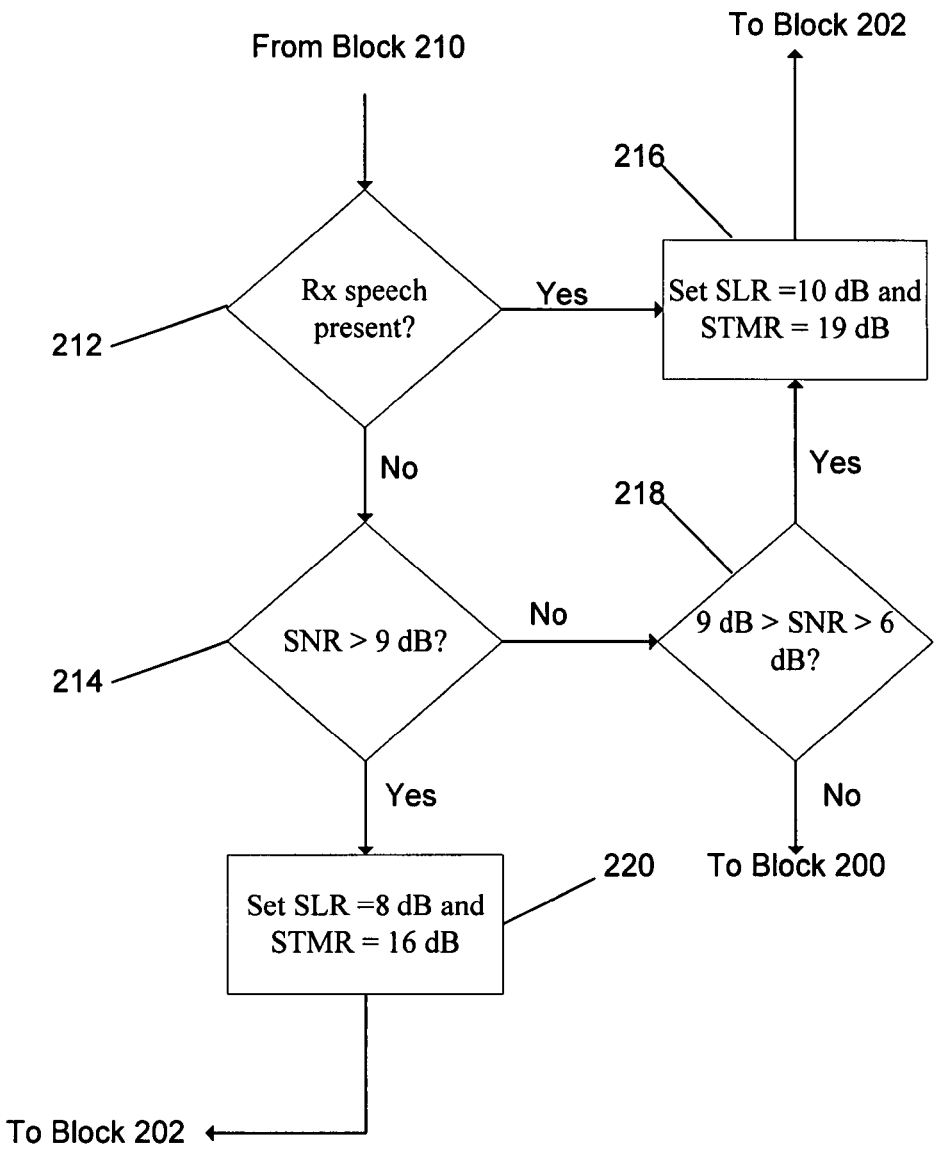

FIGS. 3A-3C are a flowchart illustrating the operation of the invention in one particular implementation of the process shown in FIGS. 2A-2C for a mobile application such as a cellular telephone headset. At block 200, the whisper mode controller initializes/sets the transmit signal gain to a predetermined value corresponding to an SLR=14 dB. Also at block 200, the whisper mode controller initializes/sets a gain of a sidetone feedback signal to a predetermined value corresponding to an STMR=22 dB.

At block 202, the whisper mode controller receives a transmit signal voice activity status, transmit signal speech level, transmit signal SNR, and receive signal voice activity status. At decision block 204, if the transmit signal voice activity status corresponds to no speech present in the transmit signal, the process returns to block 200. If yes at block 204, at decision block 206 the whisper mode controller determines whether the transmit signal speech level is above a level greater than −30 dBm0 for 70 ms, where 1 dBm0 is the equivalent of one digital milliwatt, or 3 dB below full scale digital code for ITU-T G.711 compliant μLaw or Alaw encoded speech. If yes at block 206, the process returns to block 200. If no at block 206, at decision block 208 the whisper mode controller determines whether the transmit signal corresponds to a user whispering or speaking at a low level of speech. In the example shown in FIG. 3B, a user is determined to be speaking at a low level if the Tx speech level is less than −35 dBm0 relative to a network nominal of −25 dBm0 or 10 dB below typical speech levels for more than 5 syllables or approximately 200 ms. If not at block 208, the process returns to block 200.

If yes at block 208, at decision block 210, the whisper mode controller determines whether the SNR level is below a threshold level of 3 dB with a 3 second hysteresis. If yes at block 210, the process returns to block 200. If no at block 210, at decision block 212 the whisper mode controller determines if the Rx signal speech activity status corresponds to speech in the receive signal. If yes at block 212, at block 216 the whisper mode controller increases the transmit signal gain to correspond to an SLR=10 dB. At block 216, whisper mode controller also increases the sidetone feedback signal gain to correspond to an STMR=19 dB. After block 216, the process returns to block 202. If no at block 212, at decision block 214, the whisper mode controller determines whether the SNR is greater than 9 dB.

If yes at block 214, then at block 220 the whisper mode controller increases the transmit signal gain to correspond to an SLR=8 dB. At block 220, whisper mode controller also increases the sidetone feedback signal gain to correspond to an STMR=16 dB. After block 220, the process returns to block 202. If no at block 214, then at decision block 218 the whisper mode controller determines whether the SNR is between 6 dB and 9 dB. If yes at block 218, then the process proceeds to block 216. If no at block 218, then the process returns to block 200.

The process illustrated set forth in FIGS. 3A-3C may be implemented as follows:
1. Initialize and set SLR=14, and set STMR=22 dB
2. If speech level is low for a predetermined time X ms (Tx VAD measures <−35 dBm0 relative to network nominal of −25
    dBm0 or 10 dB below typical speech levels for more than 5 syllables or about 200 ms)
3. and if SNR >9 dB (again measured by Tx VAD, averaged over 3 seconds)
4. and if receive speech is zero (far end is silent as determined by Rx VAD)
5. then set SLR=8 dB and set STMR=16 dB
6. else if SNR <9 dB and >6 dB
7. or if receive speech is not zero (far end talker is active as determined by Rx VAD)
8. then set SLR=10 dB and set STMR=19 dB
9. else if speech stops (Tx VAD measures <−55 dBm0) or if speech level is high (Tx VAD measures >−30 dBm0 for 70 ms)
10. or if SNR <3 dB (with 3 second hysteresis)
11. then set SLR=14 dB and set STMR=22 dB
12. else set SLR=14 dB and set STMR=22 dB While the exemplary embodiments of the present invention are described and illustrated herein, it will be appreciated that they are merely illustrative and that modifications can be made to these embodiments without departing from the spirit and scope of the invention. For example, although a headset example is described any telephonic device may use the systems and methods taught herein. Although specific values are given for SNR thresholds, determining user whisper status, transmit signal gain settings, and sidetone feedback signal gain settings, these values may vary in further examples. Thus, the scope of the invention is intended to be defined only in terms of the following claims as may be amended, with each claim being expressly incorporated into this Description of Specific Embodiments as an embodiment of the invention.

The invention claimed is:

1. A method for operating a telephonic device in a whisper mode comprising:
   receiving a transmit audio signal;
   determining a transmit audio signal voice activity status;
   calculating a transmit audio signal speech level;
   calculating a transmit audio signal signal-to-noise ratio;
   determining a receive audio signal voice activity status;
   adjusting a transmit audio signal gain responsive to the transmit audio signal voice activity status, the transmit audio signal speech level, the transmit audio signal signal-to-noise ratio, and the receive audio signal voice activity status;
   adjusting a sidetone feedback signal gain in conjunction with adjusting the transmit audio signal gain, wherein adjusting the sidetone feedback signal gain is responsive to the transmit audio signal voice activity status, the transmit audio signal speech level, the transmit audio signal signal-to-noise ratio, and the receive audio signal voice activity status; and
   determining a user whisper status utilizing the transmit audio signal speech level, wherein the transmit audio signal gain is increased and the sidetone feedback signal gain is increased if the user whisper status corresponds to a user whispering.

2. The method of claim 1, wherein determining the user whisper status comprises determining if the transmit audio signal speech level is less than −35 dBm0 relative to network nominal of −25 dBm0 or 10 dB below typical speech levels for more than approximately 5 syllables or approximately 200 ms.

3. A method for operating a telephonic device in a whisper mode comprising:
   receiving a transmit audio signal;
   determining a transmit audio signal voice activity status;
   calculating a transmit audio signal speech level;
   calculating a transmit audio signal signal-to-noise ratio;
   determining a receive audio signal voice activity status;
   adjusting a transmit audio signal gain responsive to the transmit audio signal voice activity status, the transmit audio signal speech level, the transmit audio signal signal-to-noise ratio, and the receive audio signal voice activity status;
   adjusting a sidetone feedback signal gain in conjunction with adjusting the transmit audio signal gain, wherein adjusting the sidetone feedback signal gain is responsive to the transmit audio signal voice activity status, the transmit audio signal speech level, the transmit audio signal signal-to-noise ratio, and the receive audio signal voice activity status; and
   determining a user whisper status utilizing the transmit audio signal speech level, wherein the transmit audio signal gain is increased and the sidetone feedback signal gain is increased if the user whisper status corresponds to a user whispering and the transmit audio signal signal-to-noise ratio is above a signal-to-noise ratio threshold level.

4. The method of claim 3, wherein the signal-to-noise ratio threshold level is 3 dB.

5. A method for operating a telephonic device in a whisper mode comprising:
   receiving a transmit audio signal;
   determining a transmit audio signal voice activity status;
   calculating a transmit audio signal speech level;
   calculating a transmit audio signal signal-to-noise ratio;
   determining a receive audio signal voice activity status;
   adjusting a transmit audio signal gain responsive to the transmit audio signal voice activity status, the transmit audio signal speech level, the transmit audio signal signal-to-noise ratio, and the receive audio signal voice activity status;
   adjusting a sidetone feedback signal gain in conjunction with adjusting the transmit audio signal gain, wherein adjusting the sidetone feedback signal gain is responsive to the transmit audio signal voice activity status, the transmit audio signal speech level, the transmit audio signal signal-to-noise ratio, and the receive audio signal voice activity status; and
   determining a user whisper status utilizing the transmit audio signal speech level, wherein the transmit audio signal gain is increased to a first transmit audio signal gain and the sidetone feedback signal gain is increased to a first sidetone feedback signal gain if the user whisper status corresponds to a user whispering and the receive audio signal voice activity status corresponds to receive speech present, and wherein the transmit audio signal gain is increased to a second transmit audio signal gain and the sidetone feedback signal gain is increased to a second sidetone feedback signal gain if the user whisper status corresponds to a user whispering and the receive audio signal voice activity status corresponds to receive speech not present, wherein the second transmit audio signal gain is greater than the first transmit audio signal gain and the second sidetone feedback signal gain is greater than the first sidetone feedback signal gain.

6. The method of claim 5, wherein the first transmit audio signal gain corresponds to an SLR approximately equal to 10 dB and the first sidetone feedback signal gain corresponds to an STMR approximately equal to 19 dB, and the second transmit audio signal gain corresponds to an SLR approximately equal to 8 dB and the second sidetone feedback signal gain corresponds to an STMR approximately equal to 16 dB.

7. The method of claim 5, wherein the transmit audio signal gain is increased to the second transmit audio signal gain and the sidetone feedback signal gain is increased to the second sidetone feedback signal gain if the transmit audio signal signal-to-noise ratio is above a signal-to-noise ratio threshold level.

8. The method of claim 7, wherein the signal-to-noise ratio threshold level is approximately 9 dB.

9. A non-transitory computer readable storage memory storing instructions that when executed by a computer cause the computer to perform a method for operating a telephonic device in a whisper mode, comprising:
   receiving a transmit audio signal;
   determining a transmit audio signal voice activity status;
   calculating a transmit audio signal speech level;
   calculating a transmit audio signal signal-to-noise ratio;
   determining a receive audio signal voice activity status;
   adjusting a transmit audio signal gain responsive to the transmit audio signal voice activity status, the transmit audio signal speech level, the transmit audio signal signal-to-noise ratio, and the receive audio signal voice activity status;
   adjusting a sidetone feedback signal gain in conjunction with adjusting the transmit audio signal gain, wherein adjusting the sidetone feedback signal gain is responsive to the transmit audio signal voice activity status, the transmit audio signal speech level, the transmit audio signal signal-to-noise ratio, and the receive audio signal voice activity status; and
   determining a user whisper status utilizing the transmit audio signal speech level, wherein the transmit audio signal gain is increased and the sidetone feedback signal gain is increased if the user whisper status corresponds to a user whispering.

10. The non-transitory computer readable storage memory of claim 9, wherein determining the user whisper status comprises determining if the transmit audio signal speech level is less than −35 dBm0 relative to network nominal of −25 dBm0 or 10 dB below typical speech levels for more than approximately 5 syllables or approximately 200 ms.

11. A non-transitory computer readable storage memory storing instructions that when executed by a computer cause the computer to perform a method for operating a telephonic device in a whisper mode, comprising:
   receiving a transmit audio signal;
   determining a transmit audio signal voice activity status;
   calculating a transmit audio signal speech level;
   calculating a transmit audio signal signal-to-noise ratio;
   determining a receive audio signal voice activity status;
   adjusting a transmit audio signal gain responsive to the transmit audio signal voice activity status, the transmit audio signal speech level, the transmit audio signal signal-to-noise ratio, and the receive audio signal voice activity status;
   adjusting a sidetone feedback signal gain in conjunction with adjusting the transmit audio signal gain, wherein adjusting the sidetone feedback signal gain is responsive to the transmit audio signal voice activity status, the transmit audio signal speech level, the transmit audio signal signal-to-noise ratio, and the receive audio signal voice activity status; and
   determining a user whisper status utilizing the transmit audio signal speech level, wherein the transmit audio signal gain is increased and the sidetone feedback signal gain is increased if the user whisper status corresponds to a user whispering and the transmit audio signal signal-to-noise ratio is above a signal-to-noise ratio threshold level.

12. The non-transitory computer readable storage memory of claim 11, wherein the signal-to-noise ratio threshold level is 3 dB.

13. A non-transitory computer readable storage memory storing instructions that when executed by a computer cause the computer to perform a method for operating a telephonic device in a whisper mode, comprising:
   receiving a transmit audio signal;
   determining a transmit audio signal voice activity status;
   calculating a transmit audio signal speech level;
   calculating a transmit audio signal signal-to-noise ratio;
   determining a receive audio signal voice activity status;
   adjusting a transmit audio signal gain responsive to the transmit audio signal voice activity status, the transmit audio signal speech level, the transmit audio signal signal-to-noise ratio, and the receive audio signal voice activity status;
   adjusting a sidetone feedback signal gain in conjunction with adjusting the transmit audio signal gain, wherein adjusting the sidetone feedback signal gain is responsive to the transmit audio signal voice activity status, the transmit audio signal speech level, the transmit audio signal signal-to-noise ratio, and the receive audio signal voice activity status; and
   determining a user whisper status utilizing the transmit audio signal speech level, wherein the transmit audio signal gain is increased to a first transmit audio signal gain and the sidetone feedback signal gain is increased to a first sidetone feedback signal gain if the user whisper status corresponds to a user whispering and the receive audio signal voice activity status corresponds to receive speech present, and wherein the transmit audio signal gain is increased to a second transmit audio signal gain and the sidetone feedback signal gain is increased to a second sidetone feedback signal gain if the user whisper status corresponds to a user whispering and the receive audio signal voice activity status corresponds to receive speech not present, wherein the second transmit audio signal gain is greater than the first transmit audio signal gain and the second sidetone feedback signal gain is greater than the first sidetone feedback signal gain.

14. The non-transitory computer readable storage memory of claim 13, wherein the first transmit audio signal gain corresponds to an SLR approximately equal to 10 dB and the first sidetone feedback signal gain corresponds to an STMR approximately equal to 19 dB, and the second transmit audio signal gain corresponds to an SLR approximately equal to 8 dB and the second sidetone feedback signal gain corresponds to an STMR approximately equal to 16 dB.

15. The non-transitory computer readable storage memory of claim 13, wherein the transmit audio signal gain is increased to the second transmit audio signal gain and the sidetone feedback signal gain is increased to the second sidetone feedback signal gain if the transmit audio signal signal-to-noise ratio is above a signal-to-noise ratio threshold level.

16. The non-transitory computer readable storage memory of claim 15, wherein the signal-to-noise ratio threshold level is approximately 9 dB.

17. A circuit comprising:
a transmit audio signal voice detector for determining a transmit audio signal voice activity status;
a transmit audio signal speech level calculator for calculating a transmit audio signal speech level;
a transmit audio signal strength signal-to-noise ratio calculator for calculating a transmit audio signal signal-to-noise ratio;
a receive audio signal voice detector for determining a receive audio signal voice activity status;
a whisper mode operation controller comprising:
a transmit audio signal gain controller for adjusting a transmit audio signal gain;
a sidetone feedback signal gain controller for adjusting a sidetone feedback signal gain in conjunction with adjusting the transmit audio signal gain, wherein the transmit audio signal gain controller and sidetone feedback signal controller operate responsive to the transmit audio signal voice activity status, the transmit audio signal speech level, the transmit audio signal signal-to-noise ratio, and the receive audio signal voice activity status, and wherein the whisper mode operation controller determines a user whisper status utilizing the transmit audio signal speech level, wherein the transmit audio signal gain controller increases the transmit audio signal gain and the sidetone feedback signal gain controller increases the sidetone feedback signal gain if the user whisper status corresponds to a user whispering.

18. The circuit of claim 17, wherein the whisper mode operation controller determines the user whisper status by determining if the transmit audio signal speech level is less than −35 dBm0 relative to network nominal of −25 dBm0 or 10 dB below typical speech levels for more than approximately 5 syllables or approximately 200 ms.

19. A circuit comprising:
a transmit audio signal voice detector for determining a transmit audio signal voice activity status;
a transmit audio signal speech level calculator for calculating a transmit audio signal speech level;
a transmit audio signal strength signal-to-noise ratio calculator for calculating a transmit audio signal signal-to-noise ratio;
a receive audio signal voice detector for determining a receive audio signal voice activity status;
a whisper mode operation controller comprising:
a transmit audio signal gain controller for adjusting a transmit audio signal gain;
a sidetone feedback signal gain controller for adjusting a sidetone feedback signal gain in conjunction with adjusting the transmit audio signal gain, wherein the transmit audio signal gain controller and sidetone feedback signal controller operate responsive to the transmit audio signal voice activity status, the transmit audio signal speech level, the transmit audio signal signal-to-noise ratio, and the receive audio signal voice activity status, and wherein the whisper mode operation controller determines a user whisper status utilizing the transmit audio signal speech level, wherein the transmit audio signal gain controller increases the transmit audio signal gain and the sidetone feedback signal gain controller increases the sidetone feedback signal gain if the user whisper status corresponds to a user whispering and the transmit audio signal signal-to-noise ratio is above a signal-to-noise ratio threshold level.

20. The circuit of claim 19, wherein the signal-to-noise ratio threshold level is 3 dB.

21. A circuit comprising:
a transmit audio signal voice detector for determining a transmit audio signal voice activity status;
a transmit audio signal speech level calculator for calculating a transmit audio signal speech level;
a transmit audio signal strength signal-to-noise ratio calculator for calculating a transmit audio signal signal-to-noise ratio;
a receive audio signal voice detector for determining a receive audio signal voice activity status;
a whisper mode operation controller comprising:
a transmit audio signal gain controller for adjusting a transmit audio signal gain;
a sidetone feedback signal gain controller for adjusting a sidetone feedback signal gain in conjunction with adjusting the transmit audio signal gain, wherein the transmit audio signal gain controller and sidetone feedback signal controller operate responsive to the transmit audio signal voice activity status, the transmit audio signal speech level, the transmit audio signal signal-to-noise ratio, and the receive audio signal voice activity status, and wherein the whisper mode operation controller determines a user whisper status utilizing the transmit audio signal speech level, wherein the transmit audio signal gain is increased to a first transmit audio signal gain and the sidetone feedback signal gain is increased to a first sidetone feedback signal gain if the user whisper status corresponds to a user whispering and the receive audio signal voice activity status corresponds to receive speech present, and wherein the transmit audio signal gain is increased to a second transmit audio signal gain and the sidetone feedback signal gain is increased to a second sidetone feedback signal gain if the user whisper status corresponds to a user whispering and the receive audio signal voice activity status corresponds to receive speech not present, wherein the second transmit audio signal gain is greater than the first transmit audio signal gain and the second sidetone feedback signal gain is greater than the first sidetone feedback signal gain.

22. The circuit of claim 21, wherein the first transmit audio signal gain corresponds to an SLR approximately equal to 10 dB and the first sidetone feedback signal gain corresponds to an STMR approximately equal to 19 dB, and the second transmit audio signal gain corresponds to an SLR approximately equal to 8 dB and the second sidetone feedback signal gain corresponds to an STMR approximately equal to 16 dB.

23. The circuit of claim 21, wherein the transmit audio signal gain is increased to the second transmit audio signal gain and the sidetone feedback signal gain is increased to the second sidetone feedback signal gain if the transmit audio signal signal-to-noise ratio is above a signal-to-noise ratio threshold level.

24. The circuit of claim 23, wherein the signal-to-noise ratio threshold level is approximately 9 dB.

25. A method for operating a telephonic device in a whisper mode comprising:

receiving a transmit audio signal;
determining a transmit audio signal voice activity status;
calculating a transmit audio signal speech level;
determining a user whisper status utilizing the transmit audio signal speech level;
calculating a transmit audio signal signal-to-noise ratio;
determining a receive audio signal voice activity status; and
adjusting a transmit audio signal gain responsive to the transmit audio signal voice activity status, the transmit audio signal speech level, the transmit audio signal signal-to-noise ratio, and the receive audio signal voice activity status, the adjusting comprising increasing the transmit audio signal gain if the user whisper status corresponds to a user whispering, wherein the transmit audio signal gain is increased to a first transmit audio signal gain if the user whisper status corresponds to a user whispering and the receive audio signal voice activity status corresponds to receive speech present, and wherein the transmit audio signal gain is increased to a second transmit audio signal gain if the user whisper status corresponds to a user whispering and the receive audio signal voice activity status corresponds to receive speech not present, wherein the second transmit audio signal gain is greater than the first transmit audio signal gain.

26. The method of claim 25, wherein determining the user whisper status comprises determining if the transmit audio signal speech level is less than −35 dBm0 relative to network nominal of −25 dBm0 or 10 dB below typical speech levels for more than approximately 5 syllables or approximately 200 ms.

27. The method of claim 25, wherein the transmit audio signal gain is increased if the user whisper status corresponds to a user whispering and the transmit audio signal signal-to-noise ratio is above a signal-to-noise ratio threshold level.

28. The method of claim 25, wherein the first transmit audio signal gain corresponds to an SLR approximately equal to 10 dB, and the second transmit audio signal gain corresponds to an SLR approximately equal to 8 dB.

29. The method of claim 25, wherein the transmit audio signal gain is increased to the second transmit audio signal gain if the transmit audio signal signal-to-noise ratio is above a signal-to-noise ratio threshold level.

* * * * *